US 6,592,377 B2

(12) United States Patent
Bendele, Jr.

(10) Patent No.: US 6,592,377 B2
(45) Date of Patent: Jul. 15, 2003

(54) SNOWBOARD TEACHING DEVICE

(76) Inventor: Karl J. Bendele, Jr., 4849 S. Xenophon St., Morrison, CO (US) 80465

( * ) Notice: Subject to any disclaimer, the term of this patent is extended or adjusted under 35 U.S.C. 154(b) by 0 days.

(21) Appl. No.: 09/976,998

(22) Filed: Oct. 12, 2001

(65) Prior Publication Data
US 2003/0073059 A1 Apr. 17, 2003

(51) Int. Cl.$^7$ .............................................. A63B 69/18
(52) U.S. Cl. ......................... 434/253; 434/250; 482/71
(58) Field of Search ................................. 434/247, 250, 434/253, 254, 255; 482/51, 55, 56, 70, 71, 34, 41, 42, 126

(56) References Cited

U.S. PATENT DOCUMENTS

| 2,545,009 A | * | 3/1951 | Spiteri ........................ 482/126 |
| 4,214,382 A | | 7/1980 | Matsutani |
| 4,406,453 A | * | 9/1983 | Herzfeld ..................... 482/126 |
| 4,505,681 A | | 3/1985 | Jones |
| 4,513,961 A | | 4/1985 | Killen |
| 5,074,795 A | | 12/1991 | Clark |
| 5,120,227 A | | 6/1992 | Born |
| 5,192,258 A | | 3/1993 | Keller |
| 5,312,258 A | | 5/1994 | Girgio |
| 5,378,156 A | | 1/1995 | Rohe |
| 5,545,115 A | | 8/1996 | Corcoran |
| 5,569,125 A | * | 10/1996 | Clementi ..................... 482/126 |
| 5,601,434 A | | 2/1997 | Winters |
| 5,895,340 A | | 4/1999 | Keller |
| 5,911,652 A | * | 6/1999 | Jackson ...................... 482/121 |
| 6,019,608 A | | 2/2000 | Stark |
| 6,022,272 A | | 2/2000 | Sano |

* cited by examiner

Primary Examiner—Kien T. Nguyen
(74) Attorney, Agent, or Firm—Ellen Reilly; John E. Reilly

(57) ABSTRACT

A snowboard teaching and recreational device by which an instructor may direct the movement, weight shift and control the center of gravity of the pupil. The device preferably uses two parallel tubes as a support frame, with two crossbars secured to the support frame and spaced handle grips on each crossbar. The instructor grasps one end of the support frame while the pupil grasps the opposite end, thereby allowing the instructor to direct the weight shift and movements of the pupil through use of the said device.

8 Claims, 1 Drawing Sheet

SNOWBOARD TEACHING DEVICE

BACKGROUND AND FIELD OF INVENTION

This invention relates to teaching and recreational devices and more particularly relates to a novel and improved apparatus for teaching and training a novice snowboarder.

DESCRIPTION OF THE PRIOR ART

Various devices have been used to teach alpine skiing and snowboarding. Many of the devices in use for teaching snowboarding and alpine skiing utilize a harness or physical attachment to the inexperienced pupil so that the instructor can actively control the movement and weight-shifting of the pupil. Snowboarding is a sport which developed from alpine skiing in which the snowboarder or rider may removably secure both feet to an oversized board. The rider then traverses a ski slope using the snowboard in place of skis.

The technique of snowboarding requires a rider to perform a great deal of weight shifting, while at the same time retaining the rider's center of gravity over the snowboard in order to traverse the ski hill. Typically, a rider wears snowboard boots which are specifically designed to be removably secured to a snowboard through the use of specialized boot bindings that are attached to the board. The rider's feet are aligned substantially perpendicular to the length of the snowboard. The snowboard consists of dual lateral edges, the "toe edge" and "heel edge". The toe edge is the lateral edge on the snowboard that is closest to the toes of the rider. The heel edge is the snowboard lateral edge that is closest to the heels of the rider. The "uphill edge" refers to the edge of the snowboard that is facing uphill on an incline. In order to traverse a snow-covered incline using the snowboard, the rider must balance on either the toe edge or heel edge of the snowboard. This can be very difficult to accomplish when first learning the sport and may result in numerous falls, as well as the danger of serious injury. Snowboarding requires different weight-shifting and more control of balance than that of alpine skiing. Due to the lack of ski poles and the fact that the rider is balancing both feet on one oversized board, the need for a teaching apparatus that aids in maintaining balance is evident.

This invention satisfies an unmet need for a snowboard teaching device that enables an instructor to aid in balance control and weight-shifting of the pupil while at the same time allowing the pupil to release the device at any time while snowboarding. Further, this device may also be used as a recreational device to execute different maneuvers by a pair of snowboarders as well as in any other similar type sport where weight shift and balance are critical factors, such as, alpine skiing and skateboarding.

SUMMARY OF THE INVENTION

It is therefore an object of the present invention to provide for a novel and improved teaching device whereby the instructor can direct the weight-shift of the pupil in a reliable and efficient manner.

It is another object of the present invention to provide for a novel and improved snowboard teaching device in which the only point of contact with the pupil is through the handles which are grasped by the pupil.

It is another object of the present invention to provide for a novel and improved snowboard teaching device that is lightweight and portable.

It is another object of the present invention to provide for a novel and improved snowboard teaching device which allows the pupil to disengage from the device at any time thereby developing autonomous techniques.

It is another object of the present invention to provide for a novel and improved snowboard teaching device having a unique combination of rigid parallel bars that provide maximum support and leverage for the instructor in supporting and directing the pupil.

A further object of the present invention is to provide for a novel teaching device for aiding weight shift and balance control in various activities such as alpine skiing and skateboarding.

An advantage of the present invention is that it can be retracted quickly by the instructor to prevent injury to the pupil in case of a fall.

Another advantage of the present invention is that it is not secured to the pupil thereby allowing quick disengagement when the situation requires it.

A further advantage of the present invention is that it requires the pupil to place his hands in front of his body, further aiding in weight-shifting and maintaining balance.

A final advantage of the present invention is that in an alternative embodiment, the device can be folded in half for easy storage and carrying.

In accordance with the present invention, there is provided a teaching device that broadly comprises one or more elongated tubes or bars serving as a mainframe and handles attached to each opposite end of the main frame. The handles may be attached to opposite ends of a cross bar which is then secured perpendicular to the main frame.

The only contact between the instructor and the pupil are the handles which place the pupil's hands in front, maintaining balance. If a fall is imminent, the device can be quickly retracted by the instructor so that there is no risk of the pupil falling on top of the device.

There have been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENT

The following describes the preferred embodiment of the invention and variations of that embodiment.

Figure 1:
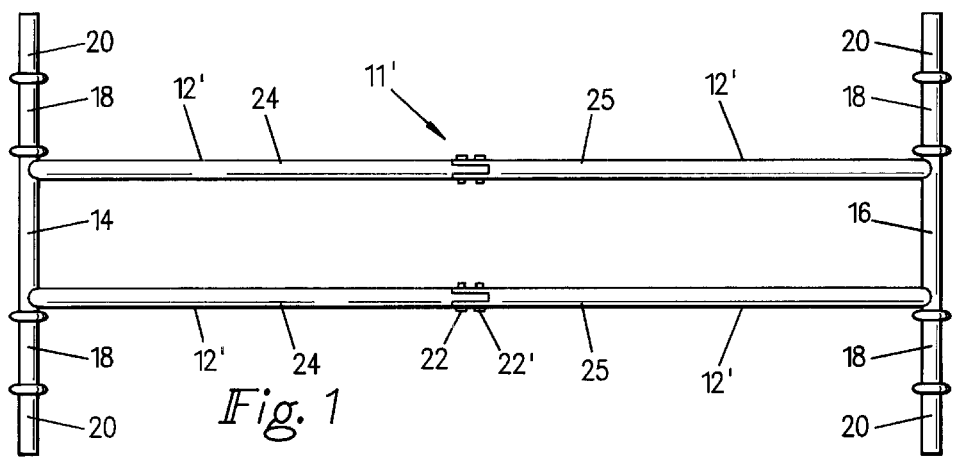
FIG. 1 is a top plan view of a preferred form of the invention.
Figure 2:
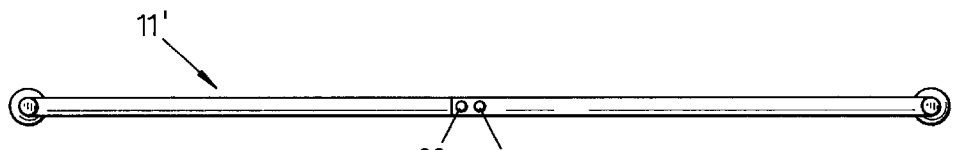
FIG. 2 is a side view of the embodiment shown in FIG. 1.
Figure 3:
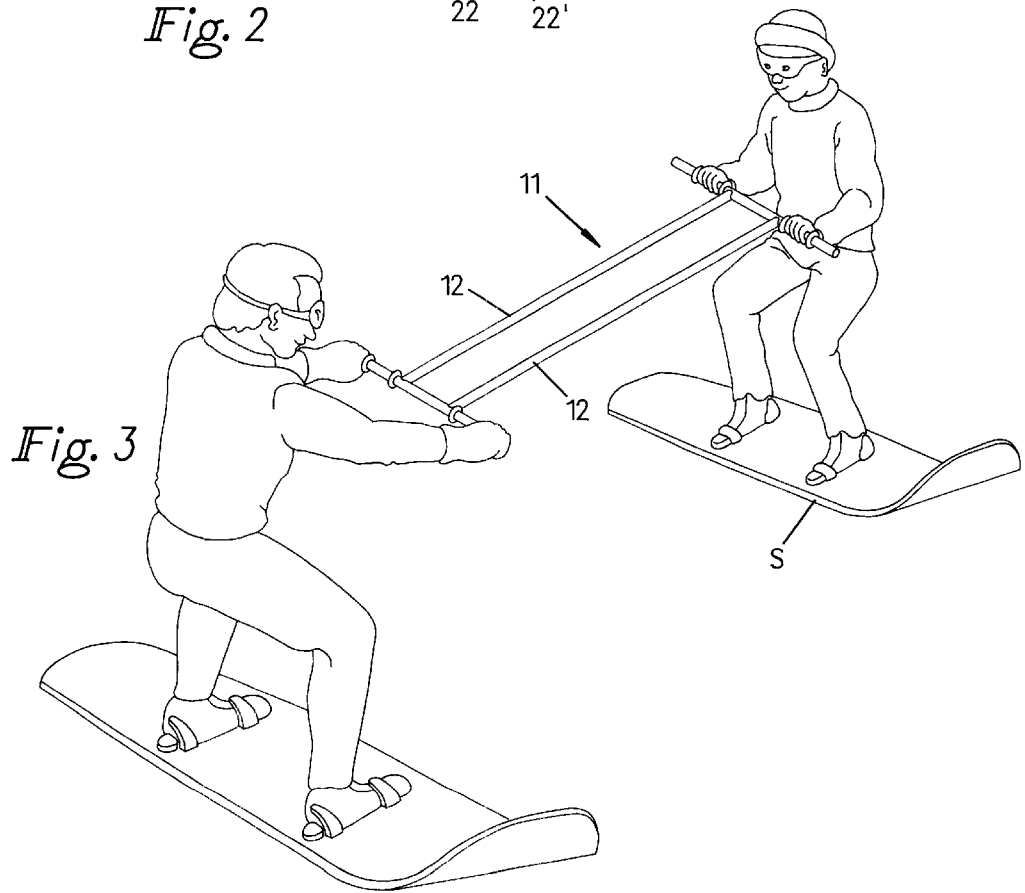
FIG. 3 is a view showing an alternate preferred form of invention in use with an instructor at one end and a pupil at the opposite end.

Referring to FIG. 3, a snowboard teaching device comprises a main frame 11, in the form of two elongated spaced parallel and coextensive tubes or bars 12, as shown in FIG. 3; or hinged frame portions 24 and 25 making up each frame member 11' as shown in FIGS. 1 and 2. The tubes 12 or 12' are composed of a rigid material, such as aluminum, in order to maintain their rigidity but to allow for lightness and ease of carrying the device. The parallel tubes 12 or 12' are positioned approximately 6" apart and their length may vary according to the sizes of the instructor and pupil. Preferably, the tubes 12 and 12' are in the range of 40" to 48" long.

The tubes affixed at opposite ends of said parallel tubes 12 and 12' are shorter tubes 14, 16, hereinafter referred to as handlebars which are preferably in the form of crossbars extending perpendicular to as well as being rigidly connected to the main frame 11 or 11'. The crossbars are rigidly and permanently affixed, such as, by welding so as to extend in the plane of the main frame 11 or 11'.

It will be evident that the device of the present invention can be utilized also as a recreational device to enable a pair of snowboarders to execute different maneuvers on a slope with the device extending between them and to communicate by pressure exerted on the device in order to accomplish different turns and maneuvers as desired. Similarly, the device can be used by skateboarders and skiers as a teaching and recreational device, although in the case of alpine skiing would be practically limited or used more with short skis.

Referring to FIGS. 1 through 3, the crossbars 14 and 16 are preferably of tubular construction and are comprised of two sets of hand grips 18 and 20. The grips preferably are fashioned from foam rubber or other similar type material. The grips 18 are in closer proximity to the parallel tubes 12 and 12' than the grips 20, and these function as grips for small adults or children. The grips 20, located on the outer portion of the crossbars 14 and 16 are for adults or older children.

In the one preferred embodiment of the invention, a standard hinge having a pair of cross pins, 22 and 22' is inserted in aligned bores in the complementary ends of the frame members 24 and 25, and shown in FIGS. 1 and 2. The hinge functions to allow the device to be collapsible for storing and/or carrying by removing one of the pins 22 or 22'.

Alternative embodiments include, but are not limited to, the mainframe being composed of plastic, ceramic or a lightweight metal bar. Further the handle bars attached to the mainframe may extend parallel to, as well as being rigidly connected to the mainframe 11 or 11'.

In using the teaching aid, see FIG. 3, the instructor is positioned at one end of the frame 11, grasping the hand grips 20. The pupil is positioned at the opposite end grasping either the inner hand grips 18, or the outer adult hand grips 20. The pupil is facing the instructor and the instructor is guiding and supporting the student through the main frame 11. The instructor is able to aid the pupil in maintaining balance while allowing the pupil to attempt weight shifting from one lateral edge of a snowboard S to the opposite lateral edge. This is accomplished through the support offered by the teaching device in conjunction with the instructor grasping the opposite end of the device, to provide further support. A particular advantage is that the instructor has the ability to exert greater leverage and control through the spaced parallel tubes or bars 12 or 12' making up the mainframe 11 or 11' to counterbalance any tendency of the pupil to unduly sway or lean in a sidewise direction. Thus, for example, the instructor can apply somewhat of a torsional force through the main frame in a direction to counterbalance undue leaning or swaying of the student in a particular direction. Through the rigid frame construction, the instructor can better communicate or reinforce any verbal commands or suggestions made to the student.

The first step in teaching a novice snowboarder is to teach the skill of sliding down an incline. This involves a rider positioning his/her center of gravity over the snowboard while leaning toward the uphill lateral edge. Through use of the teaching device, the instructor can provide additional support so that the pupil may maintain balance and accomplish the task of focusing more weight on the uphill lateral edge to perform sliding, without fear of losing one's balance.

Another step involves teaching the rider to traverse an incline. In order for the pupil to traverse an incline, the instructor, through use of the device, can direct the movement of the pupil with application of force to the device which translates to the pupil. Also, through use of the device, the instructor can provide needed support so that the pupil may maintain balance by grasping the device, and prevent injurious falls. Further, the instructor, through use of the device, can maintain the pupil upright while the pupil attempts to stop. Stopping is typically accomplished by a weight shift onto the uphill lateral edge.

It is therefore to be understood that while preferred forms form of invention are herein set forth and described, various modifications and changes may be made therein without departing from the spirit and scope of the present invention as defined by the appended claims and reasonable equivalents thereof.

I claim:

1. A snowboard teaching device comprising two elongated tubes having first and second ends:
   a) handlebar means including a pair of handgrips attached to each of said first and second ends of said elongated tubes whereby to serve as the sole means of engagement to said device by a student and an instructor disposed in facing relation to one another;
   b) said handlebar means projecting laterally and outwardly away from first and second ends of said elongated tubes; and
   c) said elongated tubes including means for collapsing said elongated tubes for storage.

2. A snowboard teaching device according to claim 1, wherein said means for collapsing are defined by hinges located at midpoints of said elongated tubes.

3. A snowboard teaching device according to claim 2, wherein said elongated tubes are defined by complementary tubular portions in end to end relation separated by said hinges.

4. A snowboard teaching device according to claim 3 wherein said hinges are defined by crosspins that are removably inserted in aligned bores in said tubular portions.

5. A snowboard teaching device adapted to extend between an instructor and student for traversing a slope, comprising:
   a) two elongated tubes in spaced parallel and coextensive relation to one another each having first and second ends;
   b) handlebar means including a pair of handgrips attached to each of said first and second ends of said elongated tubes whereby to serve as the sole means of engagement to said device by said student and said instructor disposed in facing relation to one another; and said handlebar means projecting laterally and outwardly away from said first and second ends of said elongated tubes.

6. A snowboard teaching device according to claim 5 wherein said handlebar means are rigidly interconnected with said elongated tubes.

7. A snowboard teaching device according to claim 6 wherein said handlebar means are defined by crossbars secured to said elongated tubes horizontal to and in an imaginary plane passing through said elongated tubes.

8. A snowboard teaching device according to claim 7 wherein each of said handlebar means has at least one set of handle grips.

* * * * *